(12) United States Patent
Vierck

(10) Patent No.: US 8,667,648 B2
(45) Date of Patent: Mar. 11, 2014

(54) BALL HANDLE ASSEMBLY FOR A HANDHELD TOOL

(75) Inventor: Benjamin Edwin Vierck, Phoenix, AZ (US)

(73) Assignee: MTD Products Inc, Valley City, OH (US)

( * ) Notice: Subject to any disclaimer, the term of this patent is extended or adjusted under 35 U.S.C. 154(b) by 0 days.

(21) Appl. No.: 13/219,006

(22) Filed: Aug. 26, 2011

(65) Prior Publication Data

US 2013/0047802 A1  Feb. 28, 2013

(51) Int. Cl.
*B25G 1/00* (2006.01)
*A01D 34/90* (2006.01)
*A01D 34/00* (2006.01)
*A01G 3/06* (2006.01)

(52) U.S. Cl.
USPC ............... 16/426; 16/422; 30/276; 30/296.1; 56/12.7

(58) Field of Classification Search
USPC ............. 16/426, 429, 436, 408, 444; 294/58; 81/489; 403/90, 128, 131, 135, 137, 403/141, 142, 143, 289, 290; 30/276, 30/296.1; 56/12.7
See application file for complete search history.

(56) References Cited

U.S. PATENT DOCUMENTS

| | | | | |
|---|---|---|---|---|
| 511,479 | A | * | 12/1893 | Westbrook .................... 74/551.4 |
| 2,382,773 | A | * | 8/1945 | Chambers et al. ............ 384/208 |
| 2,652,221 | A | * | 9/1953 | Kampa ....................... 248/276.1 |
| 2,984,249 | A | * | 5/1961 | Sears, Jr. et al. ................ 135/21 |
| D249,630 | S | * | 9/1978 | Ballas ................................. D8/8 |
| 4,156,312 | A | * | 5/1979 | Ballas, Sr. ........................ 30/276 |
| 4,360,971 | A | * | 11/1982 | Fellmann ..................... 30/296.1 |
| 4,477,865 | A | * | 10/1984 | Tsuyama ....................... 362/396 |
| 4,651,422 | A | * | 3/1987 | Everts ............................. 30/347 |
| 4,684,125 | A | * | 8/1987 | Lantz ............................. 482/112 |
| 4,823,464 | A | * | 4/1989 | Gorski ............................ 30/276 |
| 4,825,548 | A | * | 5/1989 | Driggers ......................... 30/276 |
| 4,848,846 | A | * | 7/1989 | Yamada et al. ................. 30/276 |
| 4,860,451 | A | * | 8/1989 | Pilatowicz et al. ............. 30/276 |
| 4,893,994 | A | * | 1/1990 | Copp ............................ 417/269 |
| 4,916,886 | A | * | 4/1990 | Nakamura et al. ............. 56/12.7 |

(Continued)

FOREIGN PATENT DOCUMENTS

| | | | | |
|---|---|---|---|---|
| DE | | 3643784 A1 | * 7/1987 | ............. B25B 15/02 |
| DE | | 199 61 374 | 6/2001 | |

(Continued)

OTHER PUBLICATIONS

International Search Report and Written Opinion dated May 27, 2013 for corresponding application No. PCT/US2012/052261 filed Aug. 24, 2012.

*Primary Examiner* — Victor Batson
*Assistant Examiner* — Jason W San
(74) *Attorney, Agent, or Firm* — Wegman, Hessler & Vanderburg

(57) ABSTRACT

A ball handle assembly for a handheld tool is provided. The handheld tool includes a powered mechanism, an actuating mechanism for actuating the powered mechanism, and an elongated boom extending between the powered mechanism and the actuating mechanism. A ball handle assembly is adjustably attached to the boom to allow a user to adjust the ball handle assembly relative to the boom to provide a comfortable and ergonomic orientation regardless of the handedness of the operator. The ball handle assembly is translatable along the length of the boom, and the ball handle assembly provides for three degrees of rotation relative to the boom.

16 Claims, 6 Drawing Sheets

(56) References Cited

U.S. PATENT DOCUMENTS

| | | | | |
|---|---|---|---|---|
| 4,953,294 A * | 9/1990 | Dohse | | 30/276 |
| 4,980,805 A * | 12/1990 | Maglica et al. | | 362/191 |
| 4,981,297 A * | 1/1991 | Foster | | 473/206 |
| 4,993,739 A * | 2/1991 | Putnam | | 280/511 |
| 5,048,187 A * | 9/1991 | Ryan | | 30/276 |
| 5,062,026 A * | 10/1991 | Maglica et al. | | 362/191 |
| 5,107,665 A * | 4/1992 | Wright | | 56/12.7 |
| 5,109,321 A * | 4/1992 | Maglica et al. | | 362/191 |
| 5,128,841 A * | 7/1992 | Maglica et al. | | 362/191 |
| 5,184,884 A * | 2/1993 | Maglica et al. | | 362/191 |
| 5,265,341 A * | 11/1993 | Kikuchi | | 30/276 |
| 5,270,911 A * | 12/1993 | Maglica et al. | | 362/396 |
| 5,415,445 A * | 5/1995 | Van Mullen et al. | | 294/16 |
| 5,594,990 A * | 1/1997 | Brant et al. | | 30/122 |
| 5,626,057 A * | 5/1997 | Nishigai et al. | | 74/473.34 |
| 5,644,844 A * | 7/1997 | Pink | | 30/276 |
| 5,669,101 A * | 9/1997 | Aiyama et al. | | 16/436 |
| 5,722,111 A * | 3/1998 | Sowell et al. | | 15/330 |
| 5,776,006 A * | 7/1998 | Gruber | | 473/256 |
| 5,803,642 A * | 9/1998 | Sassmannshausen | | 403/90 |
| 5,867,911 A * | 2/1999 | Yates et al. | | 30/276 |
| 5,933,966 A * | 8/1999 | Yates et al. | | 30/276 |
| 5,950,317 A * | 9/1999 | Yates et al. | | 30/276 |
| 6,070,835 A * | 6/2000 | Stillinger | | 248/56 |
| 6,250,338 B1 * | 6/2001 | Dempsey | | 138/103 |
| 6,260,278 B1 * | 7/2001 | Faher | | 30/276 |
| 6,439,088 B1 * | 8/2002 | Eytchison et al. | | 83/13 |
| 6,581,246 B1 * | 6/2003 | Polette | | 16/429 |
| 6,938,865 B1 * | 9/2005 | Day | | 248/229.14 |
| 7,143,780 B1 * | 12/2006 | Pitts | | 137/382 |
| 7,226,234 B2 * | 6/2007 | Gordy et al. | | 403/344 |
| 7,314,096 B2 * | 1/2008 | Shaffer et al. | | 172/372 |
| 7,382,104 B2 * | 6/2008 | Jacobson et al. | | 318/276 |
| 7,520,029 B2 * | 4/2009 | Jonsson | | 16/426 |
| 7,534,965 B1 * | 5/2009 | Thompson | | 174/153 G |
| 7,621,073 B2 * | 11/2009 | O'Keeffe | | 43/54.1 |
| D609,066 S | 2/2010 | Tinius | | |
| 7,657,972 B2 * | 2/2010 | Jenkins | | 16/426 |
| 7,670,077 B2 * | 3/2010 | Jan et al. | | 403/90 |
| 7,739,800 B2 * | 6/2010 | Hurley et al. | | 30/276 |
| D625,970 S | 10/2010 | Tinius | | |
| D625,971 S | 10/2010 | Tinius | | |
| 7,857,727 B2 * | 12/2010 | Rung | | 476/72 |
| 7,882,596 B2 * | 2/2011 | Hixon | | 16/426 |
| 7,917,997 B2 * | 4/2011 | Jonsson | | 16/426 |
| D646,387 S * | 10/2011 | Bast et al. | | D24/133 |
| D649,028 S * | 11/2011 | Nielsen | | D8/382 |
| 8,079,151 B2 * | 12/2011 | Chen | | 30/296.1 |
| 8,106,278 B2 * | 1/2012 | Eason | | 84/421 |
| 8,117,756 B2 * | 2/2012 | Nakaya et al. | | 30/276 |
| 8,127,455 B2 * | 3/2012 | Wenckel et al. | | 30/276 |
| 8,156,656 B2 * | 4/2012 | Tate et al. | | 30/392 |
| 8,186,018 B2 * | 5/2012 | Martin | | 16/426 |
| 8,381,358 B1 * | 2/2013 | Frey | | 16/426 |
| 2004/0128838 A1 * | 7/2004 | Hurst et al. | | 30/276 |
| 2004/0128839 A1 * | 7/2004 | Shaffer et al. | | 30/276 |
| 2005/0141957 A1 * | 6/2005 | Chen | | 403/290 |
| 2006/0283023 A1 * | 12/2006 | Hesson | | 30/296.1 |
| 2007/0209162 A1 * | 9/2007 | McRoberts et al. | | 16/426 |
| 2008/0173732 A1 * | 7/2008 | Johnson | | 239/526 |
| 2008/0189958 A1 * | 8/2008 | Hurley | | 30/286 |
| 2009/0000434 A1 * | 1/2009 | Shinma et al. | | 81/491 |
| 2009/0038283 A1 * | 2/2009 | Hurley | | 56/12.7 |
| 2009/0090011 A1 * | 4/2009 | Gosschalk et al. | | 30/296.1 |
| 2009/0188354 A1 * | 7/2009 | Harris | | 83/13 |
| 2010/0031515 A1 * | 2/2010 | Hurley | | 30/276 |
| 2010/0307011 A1 * | 12/2010 | Hurley et al. | | 30/320 |
| 2012/0048581 A1 * | 3/2012 | Yamada et al. | | 173/162.2 |
| 2012/0048582 A1 * | 3/2012 | Yamada et al. | | 173/162.2 |
| 2012/0055033 A1 * | 3/2012 | Yamaoka et al. | | 30/276 |
| 2012/0102755 A1 * | 5/2012 | Racov et al. | | 30/142 |
| 2012/0152049 A1 * | 6/2012 | Benson et al. | | 74/473.3 |
| 2012/0159790 A1 * | 6/2012 | Hoelscher | | 30/275.4 |
| 2012/0159792 A1 * | 6/2012 | Hoelscher | | 30/275.4 |
| 2012/0167399 A1 * | 7/2012 | Codeluppi et al. | | 30/276 |
| 2012/0180322 A1 * | 7/2012 | Takeda et al. | | 30/276 |
| 2012/0204427 A1 * | 8/2012 | Yang | | 30/276 |
| 2012/0204428 A1 * | 8/2012 | Yang | | 30/276 |

FOREIGN PATENT DOCUMENTS

| | | | |
|---|---|---|---|
| DE | 203 16 093 | 2/2004 | |
| EP | 0 919 764 | 6/1999 | |
| EP | 1 151 821 | 11/2001 | |
| EP | 2 147 750 | 1/2010 | |
| WO | WO 9317248 A1 * | 9/1993 | E04B 1/58 |
| WO | 02/30624 | 4/2002 | |
| WO | 2004/028749 | 4/2004 | |

* cited by examiner

BALL HANDLE ASSEMBLY FOR A HANDHELD TOOL

FIELD OF THE INVENTION

The present invention is directed to a lawn and garden handheld tool, and more particularly, to the handle for a handheld tool.

BACKGROUND OF THE INVENTION

Handheld lawn and garden tools such as string trimmers, pole saws, and the like having an elongated boom with a tool or implement disposed on one distal end and a control mechanism disposed on the opposing distal end are well known in the art. These handheld tools typically include a primary handle at a distal end of the elongated boom with a trigger or other actuating mechanism integrated with the primary handle. Because of the weight of the implement being attached to the opposing distal end, a secondary handle is usually attached to the boom at a location between the primary handle and the implement. The secondary handles often are either fixed relative to the boom or they are rotatable about the central axis of the boom and/or are slideable along the length of the boom.

Users of these elongated handheld tools can be either right-handed or left-handed, or simply may need to switch the hand in which they hold the tool in order to access a certain location. Additionally, each user's body shape varies, and these secondary handles do not adequately adjust for all body types/sizes, handedness, or for the type of implement attached to the boom.

Accordingly, a need therefore exists for a handle for a handheld tool that is adjustable to allow the handle to better accommodate the user by increasing the ergonomics and positionability of the handle relative to the boom and tool for all users.

BRIEF SUMMARY OF THE INVENTION

In one aspect of the present invention, a ball handle assembly attachable to a boom having a powered mechanism attached thereto is provided. The ball handle assembly includes a ball operatively connectable to the boom, wherein the ball is selectively securable to the boom. The ball handle assembly also includes a grip assembly operatively connected to the ball. A clamping mechanism is attached to the grip assembly, wherein the clamping mechanism is selectively actuatable between a secured position and an unsecured position for selectively securing the ball to the boom. The grip assembly has three degrees of rotation relative to the ball when the clamping mechanism is in the unsecured position.

In another aspect of the present invention, a ball handle assembly attachable to a boom having a powered mechanism attached thereto is provided. The ball handle assembly includes a ball having a central bore, wherein the boom is receivable in the central bore for operatively connecting the ball to the boom. The ball handle assembly also includes a grip assembly having a grip, a first cup member, and a second cup member, wherein the ball is securable between the first and second cup members. The ball handle assembly further includes a clamping mechanism attached to the grip assembly, wherein the clamping mechanism is actuatable between a secured position and an unsecured position. The grip is configured to roll, pitch, and yaw with respect to the ball when the clamping mechanism is in the unsecured position.

In yet another aspect of the present invention a handheld tool is provided. The handheld tool includes a boom having a first distal end and a second distal end. The handheld tool also includes a powered mechanism operatively connected to the first distal end of the boom. An actuating assembly is operatively connected to the second distal end of the boom, and the actuating assembly is operatively connected to the powered mechanism. A ball handle assembly is operatively connected to the boom, wherein the ball handle assembly is four degrees of movement relative to the boom.

Advantages of the present invention will become more apparent to those skilled in the art from the following description of the embodiments of the invention which have been shown and described by way of illustration. As will be realized, the invention is capable of other and different embodiments, and its details are capable of modification in various respects.

BRIEF DESCRIPTION OF SEVERAL VIEWS OF THE DRAWINGS

These and other features of the present invention, and their advantages, are illustrated specifically in embodiments of the invention now to be described, by way of example, with reference to the accompanying diagrammatic drawings, in which.

Figure 1:
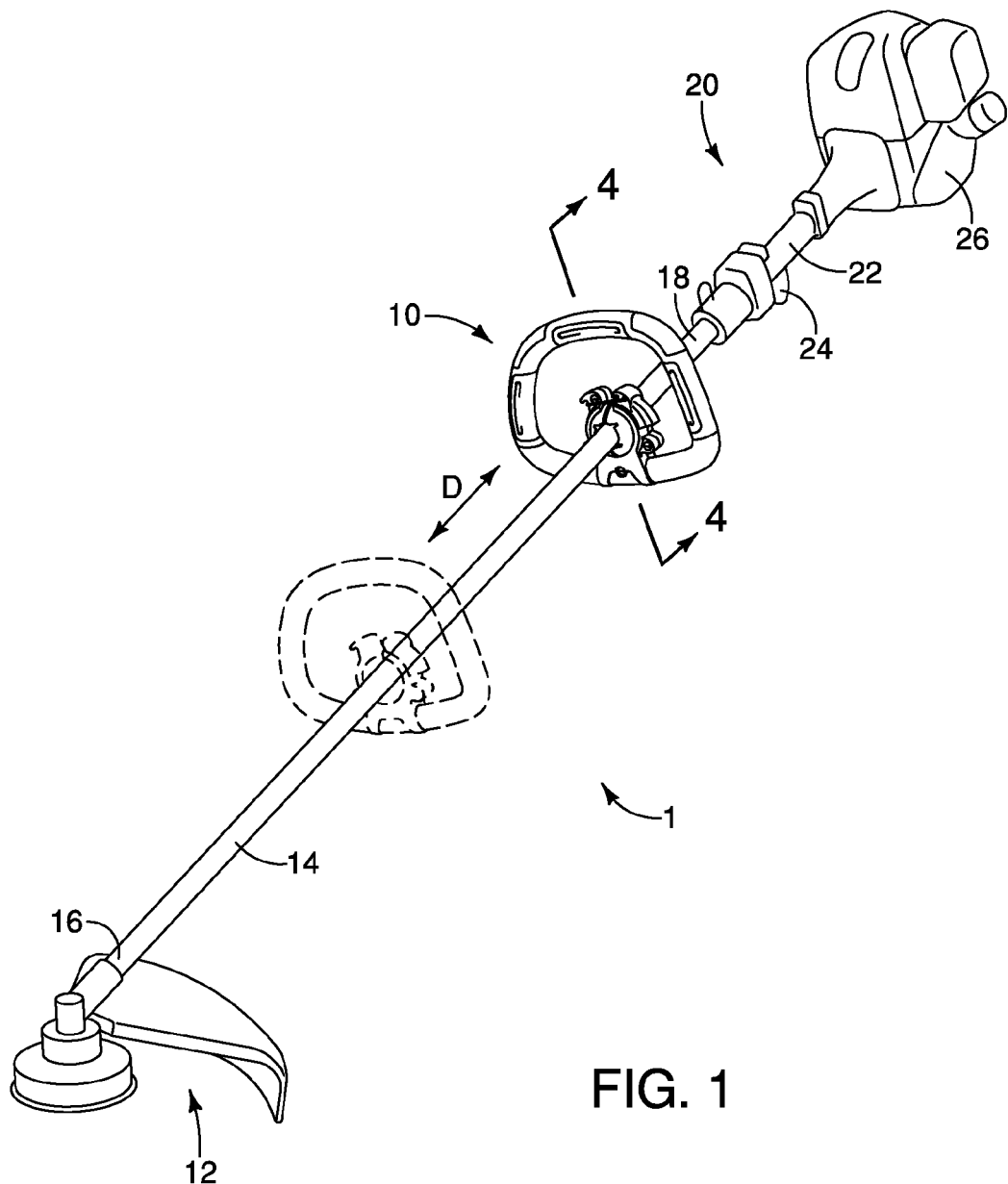
FIG. 1 is a perspective view of a ball handle assembly located on a boom with a handheld tool.

It should be noted that all the drawings are diagrammatic and not drawn to scale. Relative dimensions and proportions of parts of these figures have been shown exaggerated or reduced in size for the sake of clarity and convenience in the drawings. The same reference numbers are generally used to refer to corresponding or similar features in the different embodiments. Accordingly, the drawing(s) and description are to be regarded as illustrative in nature and not as restrictive.

DETAILED DESCRIPTION OF THE PREFERRED EMBODIMENT

Regarding FIG. 1, an exemplary embodiment of a handheld tool 1 with a ball handle assembly 10 operatively connected thereto is provided. In the illustrated embodiment, the handheld tool 1 includes a powered mechanism 12 which is shown as a trimmer, but it should be understood by one of ordinary skill in the art that any type of powered mechanism 12 can be attached to an elongated boom 14 of the handheld tool 1 including, but not limited to, a string trimmer, a hedge trimmer, pole saw, blower, or the like. The ball handle assembly 10 is configured to be operatively attached to the boom 14 that that has a first distal end 16 and a second distal end 18. The ball handle assembly is movable in four distinct manners relative to said boom 14 to provide an operator with increased ergonomic control of the handheld tool 1.

As shown in FIG. 1, the exemplary embodiment of the ball handle assembly 10 is attached to a boom 14. The boom 14 is illustrated as being a generally hollow, cylindrical member having a circular cross-sectional shape. In another embodiment, the boom 14 has a substantially square cross-sectional shape. It should be understood by one of ordinary skill in the art that boom 14 can be configured to have any cross-sectional shape. The boom 14 can be formed of aluminum, steel, plastic, or any material having sufficient stiffness, rigidity, and strength to maintain the powered mechanism 12 in a cantilevered manner relative to the ball handle assembly 10.

A powered mechanism 12 is attached to the first distal end 16 of the boom 14, and an actuating assembly 20 is attached to the second distal end 18 of the boom 14, as shown in FIG. 1. The actuating assembly 20 is configured to actuate the powered mechanism 12. The actuating assembly 20 may include a gripping member 22 and a trigger 24. The gripping member 22 allows an operator to grasp the actuating assembly 20 to assist in balancing and controlling movement of the powered mechanism 12. The trigger 24 can be any actuating means configured to start, stop, or otherwise actuate the powered mechanism 12, and the trigger 24 is operatively connected to the powered mechanism 12 for controlling and operating the powered mechanism 12. In an embodiment, an engine 26 is operatively connected to the actuating assembly 20, and the engine 26 is configured to provide power to the powered mechanism 12. In another embodiment, the actuating assembly 20 includes an electrical cord (not shown) to provide electrical power to the powered mechanism 12. In yet another embodiment, the actuating assembly 20 may be configured to receive a battery (not shown) for powering the powered mechanism 12. It should be understood by one of ordinary skill in the art that any power source may be used to power the powered mechanism 12.

The ball handle assembly 10 operatively attached to the boom 14 at a location along the length of the boom 14, wherein the ball handle assembly 10 is configured to provide the user with a secondary handle to better control and maneuver the powered mechanism 12. As shown in FIG. 1, the ball handle assembly 10 is adjustable such that the ball handle assembly 10 can be located at any position along the length of the boom 14 between the first and second distal ends 16, 18 thereof. The ball handle assembly 10 can be positioned on the boom 14 such that it abuts either the powered mechanism 12 or the actuating assembly 20, or the ball handle assembly 10 can be positioned on the boom 14 such that it is spaced-apart from both the powered mechanism 12 and the actuating assembly 20. While the ball handle assembly 10 is positionable along the length of the boom 14, the ball handle assembly 10 is selectively securable to the boom 14 such that when the operator locates the ball handle assembly 10 in the desired position the ball handle assembly 10 is secured to the boom 14 to prevent further movement of the ball handle assembly 10 along the boom. Likewise, when the operator desires to modify the location of the ball handle assembly 10, the ball handle assembly 10 released or unsecured from the boom 14 which allows the ball handle assembly 10 to be repositioned on the boom 14.

Figure 2:
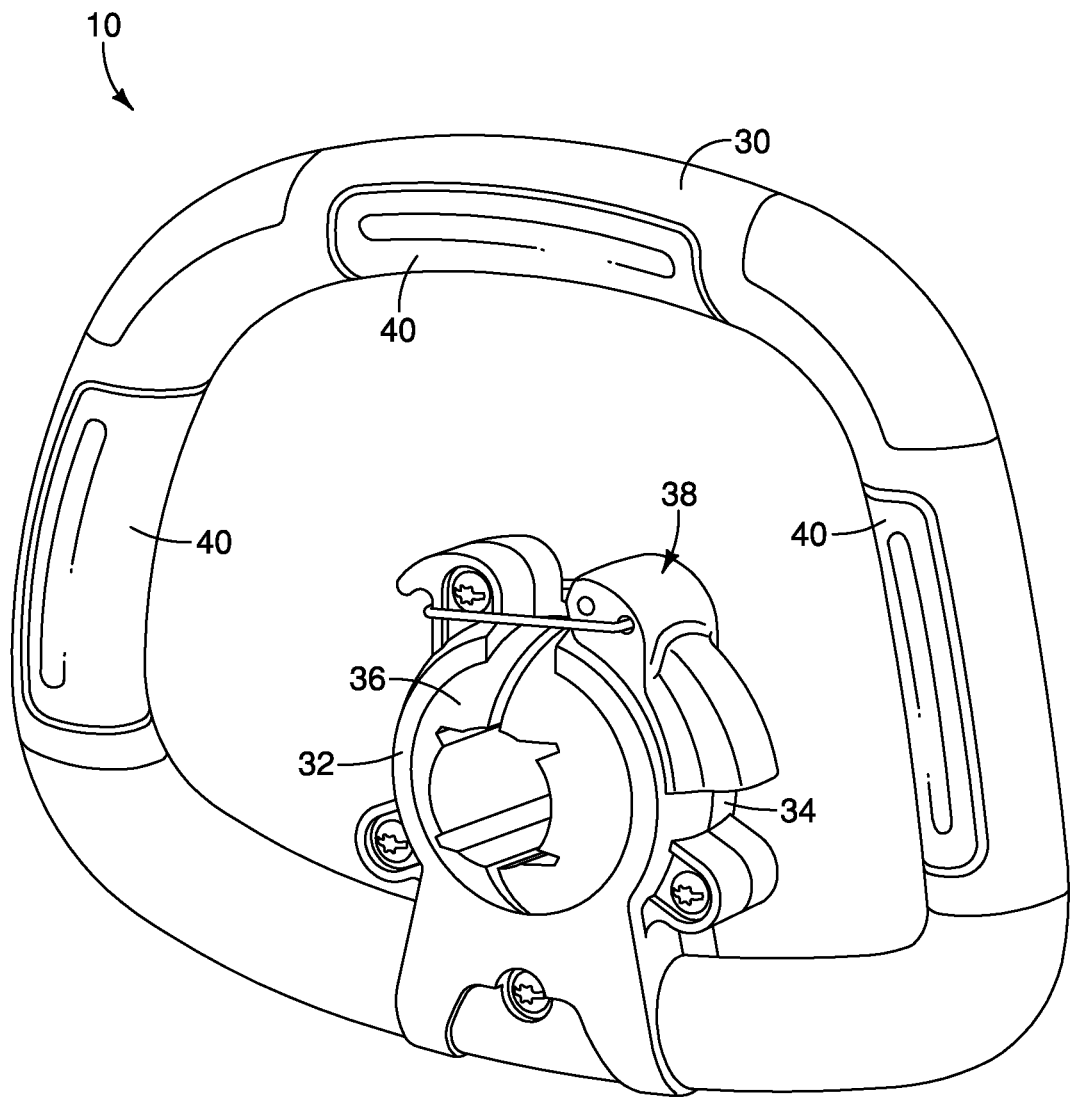
FIG. 2 is a perspective view of an exemplary embodiment of a ball handle assembly.
Figure 3:
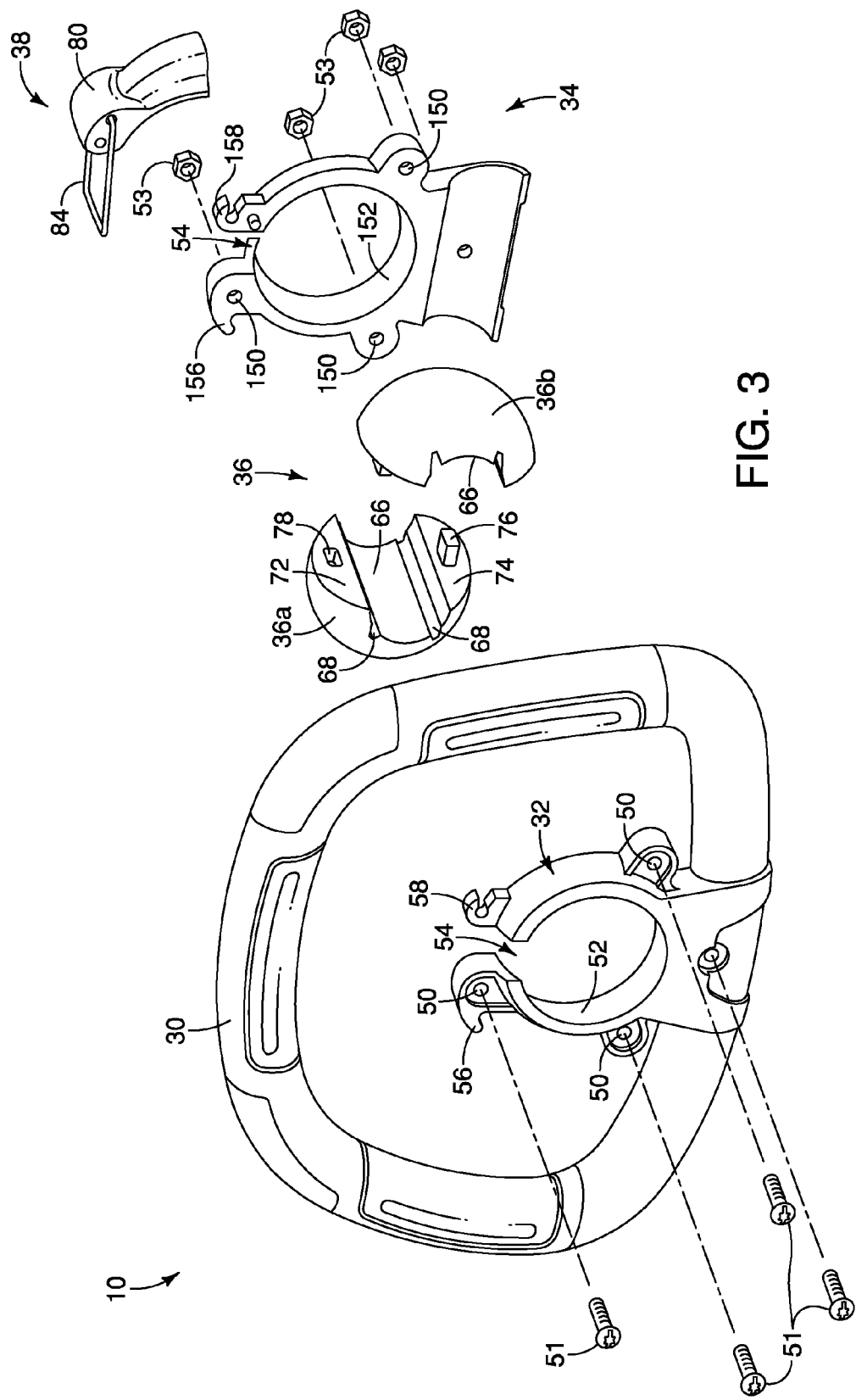
FIG. 3 is an exploded view of the ball handle assembly shown in FIG. 2.

As shown in FIGS. 2-3, an exemplary embodiment of the ball handle assembly 10 includes a grip assembly 29, a ball 36, and a clamping mechanism 38. The grip assembly 29 includes a grip 30, a first cup member 32, and a second cup member 34. In an embodiment, the grip 30 is a hollow tubular member having a generally square shape, or more particularly, a D-shape. In another embodiment, the grip 30 is a solid member having a substantially circular cross-sectional shape. The grip 30 may be formed by injection molding, extrusion, or any other manner of producing a gripable member for use with a powered mechanism 12. It should be understood by one of ordinary skill in the art that the grip 30 may be hollow or solid and be formed as any shape sufficient to allow an operator to grasp the grip 30 at various locations thereon. In an embodiment, the grip 30 is formed of polypropylene, but it should be understood by one of ordinary skill in the art that the grip 30 can be formed of any other polymer, aluminum, steel, or any material sufficient to withstand the conditions handheld tools experience during lawn maintenance. In an embodiment, the grip 30 includes a plurality of pads 40 integrally formed with the grip 30. The pads 40 are configured to provide a cushion of softer material relative to the grip 30 to absorb vibration or other shock from the powered mechanism 12 or engine 26 (FIG. 1).

In an embodiment, the first cup member 32 is integrally connected to or formed with the grip 30, as shown in FIGS. 2-5. In another embodiment, the first cup member 32 is removably connected to the grip 30. The first cup member 32 is formed of a plastic or polymer that is substantially rigid yet has a degree of flexibility, as will be described below. The first cup member 32 includes a connecting portion 42, a receiving portion 44, and a securing portion 46. The connecting portion 42 of the first cup member 32 provides a means for securing the first cup member 32 to the grip 30. In the illustrated embodiment, the connecting portion 42 includes a pair of legs 48 that extend around a lower segment of the grip 30, wherein a rear surface of each leg 48 is curved to correspond to the outer surface of the grip 30 that is received by the shape of the legs 48. The connecting portion 42 includes a boss 50 that is configured to receive a screw 51 for connecting the first cup member 32 to the second cup member 34. The receiving portion 44 is positioned adjacent to and extends from the connecting portion 42.

Figure 4:
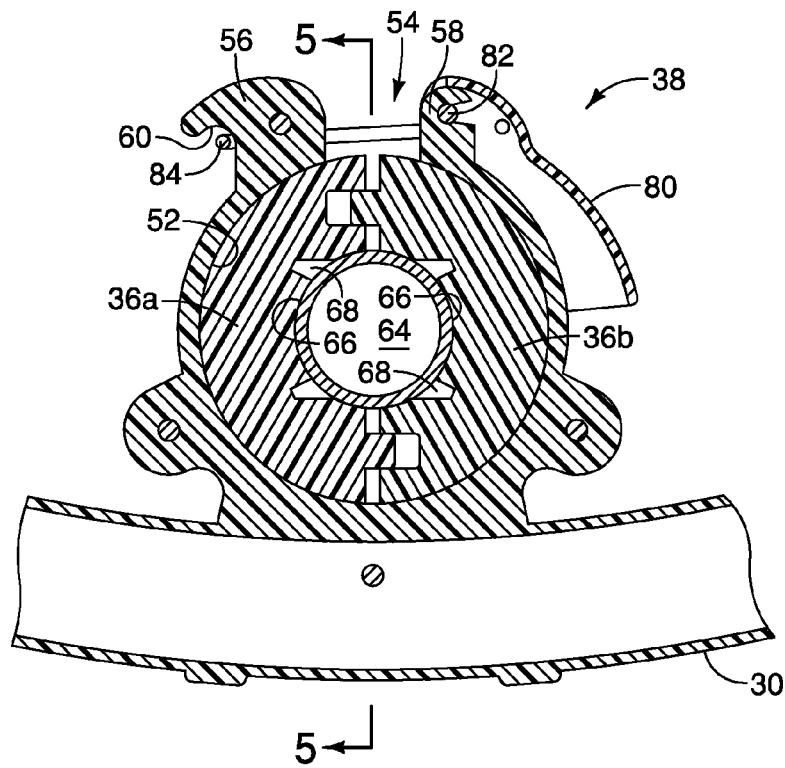
FIG. 4 is a cross-sectional view of a ball handle assembly shown in FIG. 1 along the line 4-4.
Figure 5:
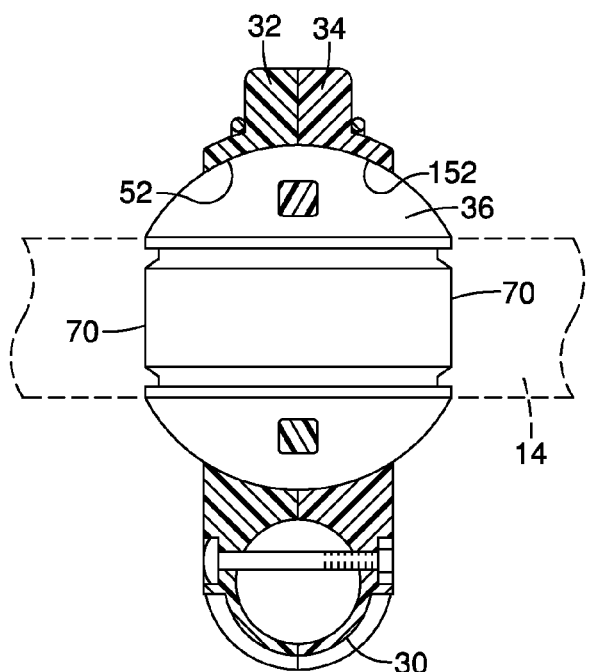
FIG. 5 is a cross-sectional view of the ball handle assembly shown in FIG. 4 along the line 5-5.

The receiving portion 44 of the first cup member 32 includes a curved surface 52, wherein the curvature of the surface 52 corresponds to the curvature of the ball 36, as shown in FIGS. 3-5. The receiving portion 44 is configured to receive a portion of the ball 36 therein such that the outer surface of the ball 36 contacts the curved surface 52. The receiving portion 44 is generally round but includes a gap 54 located opposite the connecting portion 42. Because the first cup member 32 is formed of a somewhat flexible material, the gap 54 can be closed, or nearly closed, thereby forming a complete circular recess into which the ball 36 is receivable. The securing portion 46 of the first cup member 32 is located adjacent to the gap 54, and the securing portion 46 receives the clamping mechanism 38 that is used to reduce the gap 54 and secure the ball handle assembly 10 to the boom 14.

The securing portion 46 of the first cup member 32 includes a hook 56 and an anchor 58, wherein the hook 56 and anchor 58 are spaced-apart with the gap 54 therebetween, as shown in FIGS. 3-4. The hook 56 extends away from the receiving portion 44, and the hook 56 includes a curved member that is directed away from the anchor 58 to provide a bearing surface 60. The bearing surface 60 of the hook 56 is configured to receive the clamping mechanism 38, as will be discussed below. The anchor 58 also extends away from the receiving portion 44, and the anchor 58 includes a curved member that receives the clamping mechanism 38 for securing the clamping mechanism 38 to the first cup member 32.

As shown in FIGS. 2-4, the ball 36 is positionable between the first cup member 32 and the second cup member 34 of the grip assembly 29. Because the second cup member 34 includes several features that are similar to those of the first cup member 32, these features will be represented by similar numbers. In an embodiment, the second cup member 34 includes a connecting portion 142, a receiving portion 144, and a securing portion 146. The second cup member 34 is formed of the same material as the first cup member 32 and has similar rigidity as well as flexibility. In an embodiment, second cup member 34 is releasably connected to the first cup member 32 such that the second cup member 34 engaged with the grip 30 with at least partial contact therebetween. The amount of contact between the second cup member 34 and the grip 30 is at least related to the tightness of the screw 51 connecting the first and second cup members 32, 34 about the grip 30.

As shown in FIGS. 3 and 5, the connecting portion 142 of the second cup member 34 provides a means for securing the second cup member 34 to the first cup member 32 for surrounding the grip 30. In the illustrated embodiment, the connecting portion 142 extends around a lower segment of the grip 30, wherein a forward surface is curved to correspond to the outer surface of the grip 30. The connecting portion 142 includes a boss 150 that is configured to receive a screw 51 for connecting the second cup member 34 to the first cup member 32. The receiving portion 144 is positioned adjacent to and extends from the connecting portion 142.

The receiving portion 144 of the second cup member 34 includes a nearly circular curved surface 152, wherein the curvature of the surface 152 corresponds to the curvature of the ball 36, as shown in FIGS. 3 and 5. The receiving portion 144 is configured to receive a portion of the ball 36 therein such that the outer surface of the ball 36 contacts the curved surface 152. The receiving portion 144 is generally round but includes a gap 54 located opposite the connecting portion 142. Because the second cup member 34 is formed of a somewhat flexible material, the gap 54 can be closed, or nearly closed, thereby forming a complete circular recess into which the ball 36 is receivable. The securing portion 146 of the second cup member 34 is located adjacent to the gap 54, and the securing portion 146 receives the clamping mechanism 38 that is used to reduce the gap 54 and secure the ball handle assembly 10 to the boom 14.

The securing portion 146 of the second cup member 34 includes a hook 156 and an anchor 158, wherein the hook 156 and anchor 158 are spaced-apart with the gap 54 therebetween, as shown in FIG. 3. The hook 156 extends away from the receiving portion 144, and the hook 156 includes a curved member that is directed away from the anchor 158 to provide a bearing surface 160. The bearing surface 160 of the hook 156 is configured to receive the clamping mechanism 38, as will be discussed below. The anchor 158 also extends away from the receiving portion 144, and the anchor 158 includes a curved member that receives the clamping mechanism 38 for securing the clamping mechanism 38 to the second cup member 34.

The ball 36 received by the grip assembly 29 and attachable to the boom 14 is substantially spherical, as shown in FIGS. 2-5, having slightly truncated opposing ends. In the illustrated embodiment, the ball 36 is formed of a pair of halves 36a, 36b. In another embodiment, the ball 36 can be formed of a single member. It should be understood by one of ordinary skill in the art that the ball 36 can be formed of any number of pieces being symmetrical or otherwise. The ball 36 includes a central bore 64 extending through the center thereof. The central bore 64 is a generally cylindrical aperture through the ball 36, and the central bore 64 is configured to receive the boom 14 therein. The central bore 64 is sized and shaped to correspond to the outer surface of the boom 14. The illustrated two-piece ball 36 design allows the ball 36 to be compressed about the boom 14, thereby securing the ball handle assembly 10 to the boom 14 and substantially preventing movement therebetween.

In an embodiment, the opposing halves 36a, 36b of the ball 36 are formed as the same part design but oriented in an opposing manner. In another embodiment, the opposing halves 36a, 36b of the ball 36 are different members having distinct features relative to each other. The exemplary embodiment of the ball 36 illustrated in FIGS. 3-5 are the same part, and as such, the following description relates to both halves 36a, 36b. As shown in FIG. 3, each half 36a, 36b of the illustrated embodiment includes a channel 66 that, when the ball 36 is assembled, forms the central bore 64 with the corresponding channel 66 of the opposing half of the ball 36. In an embodiment, the channel 66 forms a semi-circular surface. In another embodiment, the channel 66 forms an arced surface, or a smaller portion of a circle. Each half 36a, 36b of the ball 36 also includes a pair of elongated slots 68 that are located adjacent to the channel 66. The slots 68 are configured to be selectively openable and closeable, thereby allowing the ball 36 enough flexibility to expand and contract about the boom 14.

As shown in FIG. 5, the opposing ends 70 of the ball 36 are truncated, which provide for a pair of flat surfaces that are oriented substantially perpendicular to the longitudinal axis of the central bore 64. Each half 36a, 36b further includes an upper mating surface 72 positioned adjacent to one of the slots 68 and a lower mating surface 74 positioned adjacent to the other of the slots 68. When the halves 36a, 36b are assembled, the upper mating surface 72 of one half contacts and is in an abutting relationship with the lower mating surface 74 of the opposing half. Each of the halves 36a, 36b includes a protrusion 76 extending from the upper mating surface 72 and a detent 78 formed into the lower mating surface 74. The protrusion 76 of one half is configured to be inserted into the detent 78 of the opposing half, thereby positively locating each half relative to each other.

Forming the ball 36 as two halves 36a, 36b reduces the manufacturing costs by using the same part for each half. The two-piece ball 36 also provides for easier installation because the ball 36 surrounds the boom 14, and if the ball were a one-piece member it would require the ball to be placed onto the boom 14 at either the first or second distal end 16, 18 thereof and slid to a desire position whereas the opposing halves of the two-piece ball 36 can simply be joined together about the boom 14 at the desired location along the length thereof.

FIGS. 2-5 illustrate an exemplary embodiment of a clamping mechanism 38 configured to selectively secure and release the ball handle assembly 10 from the boom 14. In the illustrated embodiment, the clamping mechanism 38 includes a toggle 80, a securing pin 82, and a latch 84. The toggle 80 is an elongated member positioned adjacent to a section of the receiving portion 44, 144 of the first and second cup members 32, 34. The toggle can be formed as any shape or size sufficient to be rotatable about the securing pin 82. In an embodiment, the toggle 80 is formed of nylon, but it should be understood by one of ordinary skill in the art that the toggle 80 can be formed of any material such as, but not limited to, polypropylene, any other polymer, aluminum, or stainless steel. The securing pin 82 extends through the toggle 80 and integrally connected thereto. The securing pin 82 is received by the anchor 58, 158 of the first and second cup members 32, 34 for rotatably securing the clamping mechanism 38 to the first and second cup members 32, 34. The latch 84 is rotatably connected to the toggle 80 at a position adjacent to, but spaced apart from, the securing pin 82. The latch 84 is a generally U-shaped member in which the ends are connected to the opposing lateral edges of the toggle 84. The portion of the latch 84 opposite the ends connected to the toggle 84 is configured to be received by the hook 56, 156 of the first and second cup members 32, 34.

The ball handle assembly 10 is operatively connected to the boom 14, and can be attached prior to the attachment of the powered mechanism 12 and/or the actuating assembly 20 or after the powered mechanism 12 and actuating assembly 20 are attached to the boom. For assembly, both halves 36a, 36b of the ball 36 are positioned about the boom 14 such that surface of the opposing channels 66 contact the outer surface of the boom 14, wherein the boom 14 is received in the central bore 64 of the ball 36. The protrusion 76 of one of the halves 36a is inserted into the corresponding detent 78 of the other half 36b, and likewise, the protrusion of the other half 36b is inserted into the corresponding detent 78 of the first half 36a to connect the halves of the ball 36 together.

Once the ball 36 is operatively connected to the boom 14, the grip assembly 29 is operatively connected to the ball 36, thereby securing the ball 36 to the boom 14. The grip 30 and first cup member 32 are slid over an end of the boom 14 such that the boom 14 extends through the receiving portion 44. The first cup member 32 is positioned such that the outer surface of the ball 36 contacts the curved surface 52 of the receiving portion 44. Once the ball 36 is seated in the receiving portion 44 of the first cup member 32, the second cup member 34 is positioned such that the boom 14 extends through the receiving portion 144. The second cup member 34 is positioned such that the outer surface of the ball 36 contacts the curved surface 152 of the receiving portion 144, and the second cup member 34 is in abutting contact with the first cup member 32. Once the first and second cup members 32, 34 surround the ball 36, the first and second cup members 32, 34 are releasably attached to each other to positively engage the ball 36. In an embodiment, the first and second cup members 32, 34 are connected by way of a plurality of screws 51 and nuts 53 extending through the bosses 50. In another embodiment, the first and second cup members 32, 34 are connected by way of an adhesive, plastic welding, or any other manner of connecting the opposing members.

After the ball 36 is secured to the boom 14 by the grip assembly 29, the clamping mechanism 38 is attached to the grip assembly 29. The securing pin 82 is received by the anchor 58, 158 of the first and second cup members 32, 34 to provide an axis of rotation for the toggle 80. The latch 84 is then selectively receivable by the hook 56, 156 such that when the clamping mechanism 38 is engaged, a portion of the latch 84 contacts the bearing surface 60, 160 of the hook 56, 156.

Figure 6:
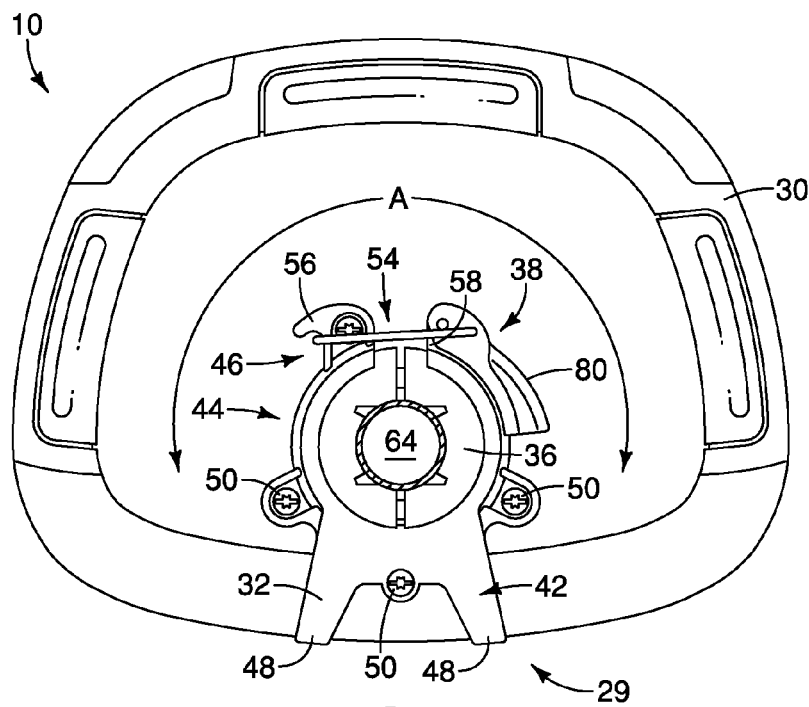
FIG. 6 is a front view of the ball handle assembly shown in FIG. 2.
Figure 7:
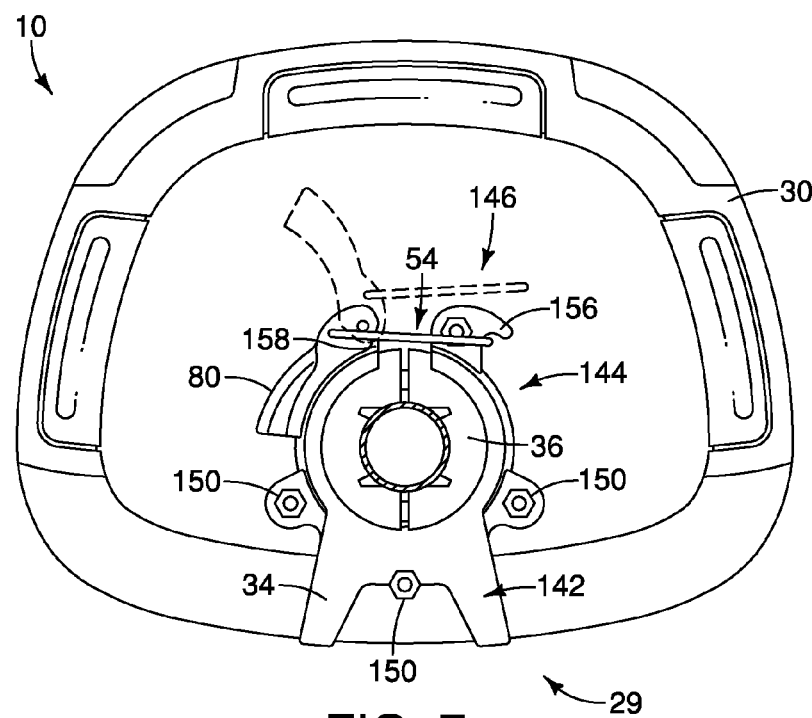
FIG. 7 is a rear view of the ball handle assembly shown in FIG. 2.

In operation, the clamping mechanism 38 is selectively actuatable between a secured position (FIG. 6) and an unsecured position (FIG. 7). When in the unsecured position, the clamping mechanism 38 is disengaged such that the latch 84 and the toggle 80 are free to rotate. Also, when the clamping mechanism 38 is in the unsecured position, the grip assembly 29 is loosely engaged with the ball 36 allowing the grip 30 to be selectively positionable about three degrees of rotation relative to the ball 36 and also allowing the grip assembly 29 and the ball 36 to be selectively positionable along the length of the boom 14, as will be discussed below.

The clamping mechanism 38 is actuatable from the unsecured position to the secured position by rotating the toggle 80 about the securing pin 82 upwardly and away from the first and second cup members 32, 34 until the latch 84 can be rotated down and over the hook 56, 156. Once the latch 84 is rotated over the hook 56, 156, the toggle 80 is rotated downwardly and toward the first and second cup members 32, 34. Rotation of the toggle 80 in this manner causes the latch 84 to engage the bearing surface 60, 160 of the hook 56, 156, and continued rotation of the toggle 80 causes the hook 56, 156 to be drawn toward the anchor 58, 158. Movement of the hook 56, 156 toward the anchor 58, 158 as the toggle 80 is rotated results in the gap 54 being reduced and generating a clamping force on the ball 36. The clamping force of the grip assembly 29 on the ball causes the ball 36 to compress such that the slots 68 are at least partially closed, and the compression of the ball 36 also exerts a force onto the outer surface of the boom 14 so as to secure the grip assembly 29 and the ball 36 at the desired position along the boom 14 as well as secure the desired position of the grip assembly 29 relative to the ball 36. When the toggle 80 is rotated such that it abuts the receiving portion 44, 144 of the first and second cup members 32, 34, the clamping mechanism 38 is in the secured position.

The clamping mechanism 38 is actuatable from the secured position to the unsecured position by rotating the toggle 80 about the securing pin 82 upwardly and away from the first and second cup members 32, 34. Upward rotation of the toggle 80 causes the latch 84 to disengage from the bearing surface 60 and allows the latch 84 to be rotated over the hook 56, 156. Continued rotation of the toggle 80 away from the first and second cup members 32, 34 allows the latch 84 to be rotated over and away from the hook 56, 156. As the latch 84 becomes disengaged, the clamping force between the hook 56, 156 and the anchor 58, 158 is loosened and these members are allowed to move away from each other. Additionally, the compression force from the grip assembly 29 onto the ball 36 and to the boom 14 is eliminated which allows the ball 36 to expand slightly and the slots 68 to open. When the toggle 80 is rotated such that it is spaced-apart from the receiving portion 44, 144 of the first and second cup members 32, 34 and the latch 84 is disengaged from the hook 56, 156, the clamping mechanism 38 is in the unsecured position.

Figure 8:
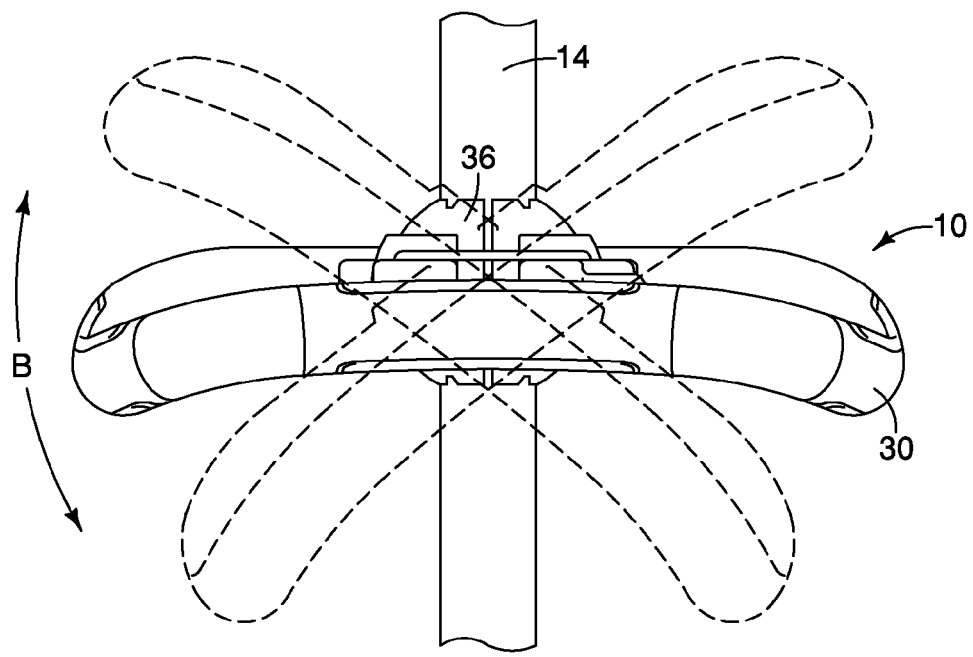
FIG. 8 shows one mode of rotation of the ball handle assembly relative to a boom.
Figure 9:
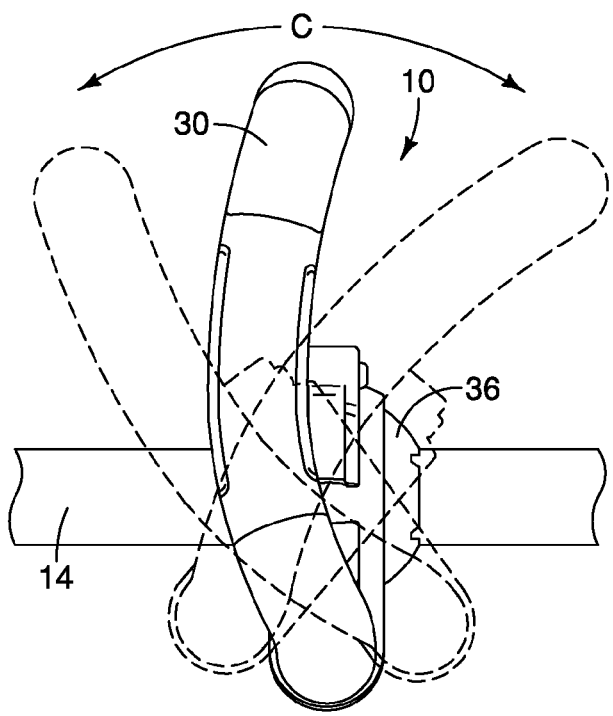
FIG. 9 shows another mode of rotation of the ball handle assembly relative to a boom.

As explained above, when the clamping mechanism 38 is in the unsecured position, the grip assembly 29 is rotatable in three degrees relative to the ball 36 and the grip assembly 29 and the ball 36 are selectively positionable along the length of the boom 14. FIG. 6 illustrates a first degree of rotation of the grip 30 of the grip assembly 29 relative to the ball 36, wherein the grip 30 is allowed to "roll" such that the grip 30 is free to rotate three hundred sixty degrees (360°) about the longitudinal axis of the boom 14, as shown by arrow A. FIG. 8 illustrates a second degree of rotation of the grip assembly 29 relative to the ball 36, wherein the grip 30 of the grip assembly 29 is allowed to "yaw" such that the grip 30 is free to rotate between about thirty degrees (30°) forward to about thirty degrees (30°) rearward about an axis of rotation that is oriented substantially perpendicular in the vertical direction relative to the longitudinal axis of the boom 14, as shown by arrow B. FIG. 9 illustrates a third degree of rotation of the grip assembly 29 relative to the ball 36, wherein the grip 30 of the grip assembly 29 is allowed to "pitch" such that the grip 30 is free to rotate between about thirty degrees (30°) forward to about thirty degrees (30°) rearward about an axis of rotation that is oriented substantially perpendicular in the horizontal direction relative to the longitudinal axis of the boom 14, as shown by arrow C. FIG. 1 illustrates the entire ball handle assembly 10 being positionable along the length of the boom 14 in a slideable manner, as shown by arrow D.

The ability of an operator to selectively position the ball handle assembly 10 along the length of the boom 14 as well as selectively rotate the grip assembly 29 in three degrees of rotation relative to the ball 36 provides for improved ergonomics by allowing the operator to move the grip 30 to a position or orientation that is most comfortable. This range of movements of the grip 30 also accommodate any operator, regardless of handedness—as in right-handed or left-handed—as there is no bias of the shape of the grip 30 favoring either. The ability to modify or adjust the position and orientation of the ball handle assembly 10 also allows the operator to determine the most comfortable position of the grip 30 depending upon the type of powered mechanism 12 attached to the boom 14, particularly when the powered mechanism 12 is interchangeable. The materials of the ball 36, first and second cup members 32, 34, grip 30, and pads 40 assist in reducing the vibration experienced by the operator.

While preferred embodiments of the present invention have been described, it should be understood that the present invention is not so limited and modifications may be made without departing from the present invention. The scope of the present invention is defined by the appended claims, and all devices, process, and methods that come within the meaning of the claims, either literally or by equivalence, are intended to be embraced therein.

What is claimed is:

1. A ball handle assembly for a handheld tool-having a powered mechanism, said ball handle assembly comprising:
   a boom;
   a ball selectively securable directly to said boom, wherein movement of said ball relative to said boom is prevented when said ball is secured to said boom;
   a grip assembly operatively connected to said ball; and
   a clamping mechanism attached to said grip assembly, wherein a portion of said clamping mechanism is selectively actuatable between a secured position and an unsecured position for selectively securing said ball to said boom;
   wherein said grip assembly has three degrees of rotation relative to said ball when said clamping mechanism is in said unsecured position;
   wherein said grip assembly includes a first cup member integrally formed with a grip and a second cup member attachable to said first cup member for securing said ball therebetween;
   wherein both of said first and second cup members includes a hook and an anchor spaced apart from said hook by way of a gap, and said clamping mechanism is rotatably attached to said anchors and releasably engageable to said hooks for selective actuation between said secured position and said unsecured position.

2. The ball handle assembly of claim 1, wherein when said clamping mechanism is in said secured position, said clamping mechanism is engaged with said hooks which generates a compression force on said ball and when said clamping mechanism is in said unsecured position, said clamping mechanism is disengaged from said hooks.

3. The ball handle assembly of claim 1, wherein said ball and grip assembly are selectively positionable along a length of said boom.

4. The ball handle assembly of claim 1, wherein said grip assembly has three degrees of rotation relative to said ball:
   i. rolling about a longitudinal axis of said boom;
   ii. pitching about an axis of rotation that is horizontally perpendicular to said longitudinal axis of said boom; and
   iii. yawing about an axis of rotation that is vertically perpendicular to said longitudinal axis of said boom.

5. The ball handle assembly of claim 4, wherein said grip assembly is rollable between zero degrees and three hundred sixty degrees)(360°) relative to said longitudinal axis of said boom, said grip assembly is pitchable between about thirty degrees)(30°) in a forward direction and about thirty degrees) (30°)in a rearward direction relative to said longitudinal axis of said boom, and said grip assembly is yawable between about thirty degrees) (30°) in a forward direction and about thirty degrees)(30°) in a rearward direction relative to said longitudinal axis of said boom.

6. A ball handle assembly for a handheld tool-having a powered mechanism, said ball handle assembly comprising:
   a boom;
   a ball selectively securable directly to said boom, wherein movement of said ball relative to said boom is prevented when said ball is secured to said boom;
   a grip assembly operatively connected to said ball; and
   a clamping mechanism attached to said grip assembly, wherein a portion of said clamping mechanism is selectively actuatable between a secured position and an unsecured position for selectively securing said ball to said boom;
   wherein said grip assembly has three degrees of rotation relative to said ball when said clamping mechanism is in said unsecured position;
   wherein said ball is formed of two halves that are operatively connectable to each other.

7. The ball handle assembly of claim 6, wherein each of said halves of said ball includes an upper mating surface, a lower mating surface, a channel extending between said upper and lower mating surfaces, a protrusion extending from said upper mating surface, and a detent formed into said lower mating surface.

8. The ball handle assembly of claim 7, wherein said protrusion of each half of said ball is receivable in said detent of said other half of said ball, and said upper mating surface of each half of said ball abuts said lower mating surface of said other half of said ball.

9. The ball handle assembly of claim 6, wherein said ball is compressible.

10. The ball handle assembly of claim 6, wherein actuation of said clamping mechanism to said secured position causes said grip assembly to assert a compression force onto said ball to secure said ball to said boom, and wherein actuation of said clamping mechanism to said unsecured position causes said compression force to be released thereby allowing said ball to be translatable along a length of said boom.

11. The ball handle assembly of claim 6, wherein said grip assembly is rollable between about zero degrees and three hundred and sixty degrees)(360°) about said ball, said grip assembly is pitchable between about thirty degrees)(30°) in a forward direction and about thirty degrees)(30°) in a rearward direction relative to said ball, and said grip assembly is yawable between about thirty degrees)(30°) in a forward direction relative to said ball, and said grip assembly is yawable between about thirty)(30°) in a forward direction and about thirty degrees)(30°) in a rearward direction relative to said ball.

12. The ball handle assembly of claim 6, wherein said ball and said grip assembly are translatable along a length of said boom.

13. A handheld tool comprising:
   a boom having a first distal end and a second distal end;
   a powered mechanism operatively connected to said first distal end of said boom;
   an actuating assembly operatively connected to said second distal end of said boom, said actuating assembly operatively connected to said powered mechanism; and
   a ball handle assembly being selectively securable directly to said boom, wherein movement of said ball handle assembly relative to said boom is prevented when said ball handle assembly is secured to said boom, and wherein said ball handle assembly includes a ball formed of opposing halves, and said ball halves are attachable to each other, said boom being receivable between said opposing ball halves.

14. The handheld tool of claim 13, wherein said ball handle assembly has four degrees of movement relative to said boom.

15. The handheld tool of claim 14, wherein said ball handle assembly is: (1) translatable along a length of said boom, (2) rollable about a longitudinal axis of said boom, (3) pitchable about an axis horizontally perpendicular to said longitudinal axis of said boom, and (4) yawable about an axis vertically perpendicular to said longitudinal axis of said boom.

16. The handheld tool of claim 15, wherein said ball handle assembly is rollable between about zero degrees and three hundred sixty degrees)(360°) about said longitudinal axis of said boom, said ball handle assembly is pitchable between about thirty degrees)(30°) in a forward direction and about thirty degrees)(30°) in a rearward direction relative to said boom, and said ball handle assembly is yawable between about thirty degrees)(30°) in a forward direction and about thirty degrees)(30°) in a rearward direction relative to said boom.

\* \* \* \* \*

UNITED STATES PATENT AND TRADEMARK OFFICE
CERTIFICATE OF CORRECTION

PATENT NO. : 8,667,648 B2
APPLICATION NO. : 13/219006
DATED : March 11, 2014
INVENTOR(S) : Benjamin Edwin Vierck Page 1 of 2

It is certified that error appears in the above-identified patent and that said Letters Patent is hereby corrected as shown below:

In the Claims:

In Claim 5, column 9, lines 65-66, after the word "and" delete "three hundred sixty degrees)(360°) relative" and insert -- three hundred sixty degrees (360°) relative -- therefor.

In Claim 5, column 9, line 67 - column 10, line 1, after the word "about" delete "thirty degrees)(30°) in" and insert -- thirty degrees (30°) in -- therefor.

In Claim 5, column 10, lines 1-2, after the word "about" delete "thirty degrees)(30°) in" and insert -- thirty degrees (30°) in -- therefor.

In Claim 5, column 10, line 4, after the word "about" delete "thirty degrees)(30°) in" and insert -- thirty degrees (30°) in -- therefor.

In Claim 5, column 10, line 5, after the word "about" in line 4 delete "thirty degrees)(30°) in" and insert -- thirty degrees (30°) in -- therefor.

In Claim 11, column 10, lines 45-46, after the word "and" delete "three hundred and sixty degrees)(360°) about" and insert -- three hundred sixty degrees (360°) about -- therefor.

In Claim 11, column 10, line 47, after the word "about" delete "thirty degrees)(30°) in" and insert -- thirty degrees (30°) in -- therefor.

In Claim 11, column 10, line 48, after the word "about" delete "thirty degrees)(30°) in" and insert -- thirty degrees (30°) in -- therefor.

In Claim 11, column 10, line 50, after the word "about" delete "thirty degrees)(30°) in" and insert -- thirty degrees (30°) in -- therefor.

Signed and Sealed this
Tenth Day of June, 2014

Michelle K. Lee
*Deputy Director of the United States Patent and Trademark Office*

CERTIFICATE OF CORRECTION (continued)
U.S. Pat. No. 8,667,648 B2

In the Claims:

In Claim 11, column 10, line 52, after the word "about" delete "thirty)(30°) in" and insert -- thirty degrees (30°) in -- therefor.

In Claim 16, column 11, lines 16-17, after the word "and" delete "three hundred sixty degrees)(360°) about" and insert -- three hundred sixty degrees (360°) about -- therefor.

In Claim 16, column 11, line 19, after the word "about" delete "thirty degrees)(30°) in" and insert -- thirty degrees (30°) in -- therefor.

In Claim 16, column 11, line 20, after the word "about" in line 19, delete "thirty degrees)(30°) in" and insert -- thirty degrees (30°) in -- therefor.

In Claim 16, column 11, line 22, after the word "about" delete "thirty degrees)(30°) in" and insert -- thirty degrees (30°) in -- therefor.

In Claim 16, column 11, line 23, after the second word "about" in line 22, delete "thirty degrees)(30°) in" and insert -- thirty degrees (30°) in -- therefor.